United States Patent [19]
Watson et al.

[11] Patent Number: 5,885,699
[45] Date of Patent: Mar. 23, 1999

[54] MULTILAYER THERMOPLASTIC PACKAGING FILM

[75] Inventors: Richard K. Watson; William D. Mayfield; Paul J. Satterwhite, all of Simpsonville, S.C.

[73] Assignee: Cryovac, Inc., Duncan, S.C.

[21] Appl. No.: 790,325

[22] Filed: Jan. 28, 1997

Related U.S. Application Data

[63] Continuation-in-part of Ser. No. 610,197, Feb. 28, 1996, abandoned, which is a continuation of Ser. No. 262,092, Jun. 20, 1994, abandoned, which is a continuation of Ser. No. 936,428, Aug. 27, 1992, abandoned.

[51] Int. Cl.⁶ .............................. B32B 27/08; B32B 27/32
[52] U.S. Cl. ..................... 428/212; 428/349; 428/516; 428/517; 428/521
[58] Field of Search .................................. 428/349, 212, 428/516, 517, 518, 520, 521, 34.7, 35.2, 35.9

[56] References Cited

U.S. PATENT DOCUMENTS

| | | | |
|---|---|---|---|
| 3,110,611 | 11/1963 | Powelson | 428/516 |
| 4,126,262 | 11/1978 | Thompson et al. | 229/17 G |
| 4,440,824 | 4/1984 | Bonis | 428/216 |
| 4,656,068 | 4/1987 | Raines | 428/35 |
| 4,810,541 | 3/1989 | Newman et al. | 428/36.7 |
| 4,855,187 | 8/1989 | Osgood, Jr. et al. | 428/516 |
| 4,935,271 | 6/1990 | Schirmer | 428/35.2 |
| 5,071,686 | 12/1991 | Genske et al. | 428/35.7 |
| 5,139,831 | 8/1992 | Mueller | 428/34.3 |

*Primary Examiner*—James J. Bell
*Assistant Examiner*—Blaire R. Copenheaver
*Attorney, Agent, or Firm*—David G. Burleson

[57] ABSTRACT

A multilayer film characterized by having excellent oxygen permeability and thermoformable properties comprising a sealant layer and a heat resistant layer is disclosed. The sealant layer contains an ethylene based polymer or copolymer. The heat resistant layer has a melting point greater than that of the polymeric composition of the sealing layer. Internal layers also can be provided.

20 Claims, No Drawings

MULTILAYER THERMOPLASTIC PACKAGING FILM

This is a continuation-in-part of U.S. patent application Ser. No. 08/610,197, filed Feb. 28, 1996, now abandoned, which is a continuation of U.S. patent application Ser. No. 08/262,092, filed Jun. 20, 1994, now abandoned, which is a continuation of U.S. patent application Ser. No. 07/936,428, filed Aug. 27, 1992, now abandoned.

BACKGROUND INFORMATION

1. Field of the Invention

The present invention relates to multilayer films useful as packaging materials, particularly to packaging films that are oxygen permeable and thermoformable such as might be used in the packaging of products such as, for example, fresh poultry, frozen red meat, and certain produce.

2. Background of the Invention

Numerous film products are employed for packaging and for delivery of food products. These films were developed to have particular properties and often employ multiple layers to obtain the desired properties. For example, use of polyolefin based films characterized by high strength, excellent moisture and water vapor resistance, fair chemical resistance, and variable processability is well known.

Polyolefins often are used in combination with other polymers. No single polymer or copolymer can possess all the desired properties, however. Thus, films made from blends of polymers as well as multilayered structures have been developed. These have been found to provide a good balance of properties depending on the end use of the film. Many films designed for packaging applications in the food industry incorporate "barrier" polymers to prevent the passage of, for example, oxygen. The present invention, however, is directed to films to be used for packaging certain food products such as fresh poultry which must necessarily possess high oxygen permeability.

For many such packaging applications, thermoforming an oxygen permeable film is desirable. Most typically, a non-thermoforming film or web is used in combination with a thermoforming film or web to produce a final package. In a typical operation, a forming film is formed into a mold to provide a cavity in which a food product is placed. A non-forming film can be placed over the cavity and vacuum sealed, by means known in the art, to the periphery of the forming web. Many meat products are packaged in this manner.

Heretofore, only one commercially available thermoformable film having good oxygen permeability properties has been available. That is, thermoformable monolayer ionomer films are known to provide high oxygen permeability. Generally speaking, ionomers are metal neutralized salts of ethylene/acrylic acid or ethylene/methacrylic acid copolymers, commercially available from DuPont de Nemours (Wilmington, Del.). Although monolayer ionomeric films produced by a blown or cast process provide oxygen permeability and thermoformability, their failure rate is high because the periphery of the film must be heated to its softening point for sealing to occur. Thus, burn through (i.e., rupture of the film due to heat) is common.

Thus, a need in the art exists for a heat-sealable, thermoformable, oxygen permeable film or web which does not degrade upon sealing.

SUMMARY OF THE INVENTION

It is thus an object of the present invention to provide a heat-sealable thermoplastic, multilayer film having good oxygen permeability. It is a more particular object of the present invention to provide a suitable thermoplastic material for packaging food products requiring oxygen permeability such as, for example, fresh poultry, frozen red meat, and fresh cut produce.

It is yet another object of the present invention to provide a multi layer, unperforated thermoplastic film having an oxygen transmission rate of at least about 2000 $cm^3 \cdot mil/m^2 \cdot 24$ hr.·atm at 73° F., preferably at least about 3000 $cm^3 \cdot Mil/m^2 \cdot 24$ hr.·atm at 73° F., more preferably at least about 4000 $cm^3 \cdot mil/m^2 \cdot 24$ hr.·atm at 73° F., most preferably at least about 5000 $cm^3 \cdot mil/m^2 \cdot 24$ hr.·atm at 73° F.

Such objects generally are achieved by a multilayer, thermoformable film which includes an outer sealing layer and an outer heat resistant layer. The melting point of the polymeric composition of the outer heat resistant layer is greater than the melting point of the sealing layer, preferably at least about 10° F. greater than the melting point of the sealing layer.

Such objects more particularly are achieved by an above-described film which includes (a) a sealing layer that includes a polymer including mer units derived from ethylene, and (b) a heat resistant layer that includes a polymer including mer units derived from propylene and/or from styrene. The film also can include layers in addition to the sealing and heat resistant layers.

The following definitions apply hereinthroughout unless a contrary intention is expressly indicated:

"polymer" means the product of a polymerization reaction and is inclusive of homopolymers, copolymers, terpolymers, etc.;

"copolymer" means polymers formed by the polymerization reaction of at least two different monomers;

"ionomer" means a metal salt of an ethylene/acrylic acid or ethylene/methacrylic acid copolymer;

"inner layer" (or "internal layer") refers to a film layer having its two principal surfaces in contact with other layers of a multilayer film;

"outer layer" means a film layer having only one of its principal surfaces directly adhered to another layer of a multilayer film;

"sealant layer" or "sealable layer" means an outer layer of a multilayer film involved in the sealing of the film to itself or another layer;

"tie layer" means an internal layer of a multilayer film having the primary purpose of adhering two layers;

"coextrusion" means the process of extruding two or more materials through a single die with two or more orifices arranged so that the extrudates merge and weld together into a laminar structure before chilling, i.e., quenching; and "$O_2$-transmission rate" (also referred to as "OTR" and "oxygen transmitability") means that property of a film measured according to ASTM D 3985, a test known to those of skill in the art.

As used herein, terminology employing a "/" with respect to the chemical identity of a copolymer (e.g., "an ethylene/α-olefin copolymer"), identifies the comonomers which are copolymerized to produce the copolymer with the primary comonomer being listed first, followed by the secondary comonomer, tertiary comonomer, etc. On a weight percentage basis, more of the primary comonomer than the secondary comonomer normally will be present.

DESCRIPTION OF PREFERRED EMBODIMENTS

The present invention provides a multilayer packaging film characterized by having excellent oxygen permeability and thermoformability properties. The multilayer film includes at least a sealing layer and a heat resistant layer. The sealing layer (i.e., the heat sealable layer) most preferably includes one or more polymers comprising mer units derived from ethylene. Examples of such polymers include, for example, low density polyethylene, ethylene/α-olefin copolymers, ethylene/vinyl acetate copolymers, ethylene/alkyl acrylate copolymers, ethylene/acrylic acid copolymers, as well as the metal salts of ethylene/acrylic acid or ethylene/methacrylic acid copolymers. The latter polymers commonly are referred to as ionomers.

Ethylene/α-olefin copolymers are, generally speaking, copolymers of ethylene with one or more comonomers selected from $C_3$ to about $C_{10}$ α-olefins, but especially includes ethylene copolymers with from $C_4$ to about $C_{10}$ α-olefins such as butene-1, pentene-1, hexene-1, octene-1, and the like. The polymers molecules comprise long chains with few side chains or branches and sometimes are referred to as linear polymers. These polymers are obtained by low pressure polymerization process and the side branching which is present is short compared to non-linear polyethylenes. Ethylene/α-olefin copolymers have a density in the range of from about 0.860 to about 0.940 g/cc. The term linear low density polyethylene (LLDPE) generally is understood to include that group of ethylene/α-olefin copolymers which fall into the density range of about 0.915 to about 0.940 g/cc. Sometimes, linear polyethylene in the density range of from about 0.926 to about 0.940 g/cc is referred to as linear medium density polyethylene (LMDPE). Lower density ethylene/α-olefin copolymers can be referred to as very low density polyethylene (VLDPE, typically used to refer to the ethylene/butene copolymers from Union Carbide) and ultra-low density polyethylene (ULDPE, typically used to refer to the ethylene/octene copolymers from Dow Chemical Co.). Although specific density ranges for VLDPE, ULDPE, LLDPE, and LMDPE have been set forth herein, no bright line can be drawn for density classifications and density can vary according to supplier.

Recently, a new class of ethylene based linear polymers has been introduced. These new resins are produced by metallocene catalyzed polymerization and are characterized by narrow or more homogeneous compositional properties, such as molecular weight distribution, than resins produced by conventional Ziegler-Natta polymerization processes. Conventional Ziegler-Natta polymerization systems have discreet catalyst composition differences which are manifested as different catalyst reaction sites with each site having different reaction rates and selectivities. Metallocene catalyst systems are characterized as a single identifiable chemical type which has a singular rate and selectivity. Thus, conventional catalyst systems produce resins that reflect the differential character of the different catalyst sites, while resins produced by metallocene systems reflect the single catalytic site (i.e., are more homogeneous).

At least some presently available ethylene based linear polymers approximate the physical and compositional properties achieved by present metallocene catalyzed polyolefins. Traditional multisite polymerization processes operating at low reaction rates can produce relatively homogeneous resins that approximate the homogeneity of metallocene catalyzed resins. An example of such are the Tafmer™ resins sold by Mitsui Chemical Co. Both metallocene catalyzed ethylene/α-olefin copolymers and traditional ethylene/α-olefin copolymers are appropriate for use in the sealing layer of the present invention.

As noted above, ionomers also can be used in the sealable layer. As has been seen in the prior art monolayer Surlyn™ resin films, such ionomeric resins provide excellent heat sealability as well as high oxygen permeability. However, unlike the monolayer films of the prior art, the present film structure also includes a heat resistant layer such that, upon sealing, the entire thickness of the film structure is not heated to its softening point.

The present film structure includes a heat resistant layer having a melting point greater than that of the sealing layer. This heat resistant layer can be made from a single polymer or from a blend of two or more polymers. Thus, when a non-forming web in accordance with the present invention is positioned above a thermoformed web containing product and sealed about the periphery thereof, the outermost surfaces of each of the two webs need not be heated to the point of softening by the sealing mechanism for adequate sealing to occur between the two respective seal layers.

Furthermore, although the present invention generally is directed to thermoformable webs, non-forming webs also are within the scope of the invention. That is, thermoformable webs which are not thermoformed in the end-use application are considered non-forming and are covered by the present invention.

Preferred for use in the heat resistant layer of the present film structure are propylene based resins (i.e., polymers comprising mer units derived from propylene) such as, for example, propylene homopolymer and certain propylene copolymers. Ethylene/propylene copolymers which have a major portion of propylene and a minor portion of ethylene are desirable for use in the present heat resistant layer, as such polymers do not become brittle at freezing temperatures (e.g., 0° C. and below). Conventional polypropylenes are desirable because of their high melting point, approximately 160° C., but may become brittle at freezing temperatures. Thus, the end-use application as well as the melting point of the polymeric composition of the heat seal layer must be considered in choosing the polymeric composition of the heat resistant layer. Specifically, the heat resistant layer must have a melting point greater than that of the heat seal layer and most preferably at least 10° F. greater than that of the heat seal layer.

Other resins appropriate for use in the heat resistant layer include polystyrene and styrene/butadiene copolymer. Examples of commercially available styrene/butadiene copolymers include the K resin series (Phillips Chem. Co.). Also within the scope of the present heat resistant layer are modified poly(vinyl chloride) resins (B.F. Goodrich Co.). Inclusion of such resins can provide stiffness to the overall film structure as well as imparting excellent oxygen permeability qualities. Although such resins can have melting points less than that of polypropylene, they can be employed in accordance with the present invention so long as the polymeric components of the heat seal layer have an even lower melting point.

Advantages of different heat resistant polymers can be incorporated into a single structure by incorporating two or more of such resins into a single film, either in separate layers or by blending. For example, in a preferred embodiment, the outermost layer is a polypropylene but an internal layer of ethylene/propylene copolymer is included. The internal ethylene/ propylene copolymer is, of course, more heat resistant than the seal layer but adds a pliancy to the structure not afforded by the more heat resistant but less pliant polypropylene. Thus, cracking at freezing temperatures is reduced. Other polymers appropriate for use in the outer heat resistant layer may also be used internally in the structure, although providing the most heat resistant polymer composition in the outermost layer is preferred.

Also within the scope of the present invention are internal tie layers which add bulk and prevent delamination without decreasing the oxygen transmitability of the entire structure. Preferred tie layers include ethylene/ vinyl acetate copolymers, ethylene/methyl acrylate copolymers, ethylene/ butyl acrylate copolymers, VLDPE, ULDPE, Tafmer™ resins, as well as metallocene catalyzed ethylene/α-olefin copolymers of lower densities. Generally speaking, most resins suitable for use in the seal layer can serve appropriately as tie layer resins. A preferred tie resin is a high vinyl acetate ethylene/vinyl acetate copolymer.

Preferred multilayer film structures of the present invention include those having at least three layers. An example of such a film is one in which the sealable layer and the heat resistant layer are separated by a tie layer comprising an ethylene/vinyl acetate copolymer tie layer. In such a three-layer structure, preferred heat resistant layers comprise polymers comprising mer units derived from propylene and preferred sealable layers comprise ethylene/α-olefin copolymers. Particularly preferred sealing layer polymers are propylene homopolymers.

Also preferred are those films having at least four layers. Such films involve the three layers mentioned in the previous paragraph with a layer comprising an ethylene/ propylene copolymer, preferably between the ethylene/vinyl acetate copolymer tie layer and the heat resistant layer. Ethylene/propylene copolymers are preferred because they have high OTR and can be thermoformed easily. Where this fourth layer is present, it preferably comprises the bulk of the film structure, i.e., about 60% of the thickness of the film.

Films having five and more layers also can be particularly useful. For example, to the four layer film described in the previous paragraph, an additional tie layer can be included between the ethylene/propylene copolymer layer (i.e., the fourth layer) and the heat resistant layer. This additional tie layer can be made from the same material as the first tie layer (e.g., an ethylene/vinyl acetate copolymer).

Where additional layers beyond five are included, they preferably are added two at a time so as to maintain the cross sectional symmetry of the film. For example, additional ethylene/propylene copolymer and tie layers can be added between the original tie layer and the sealing layer. These additional layers can be the same as or different than the previous similar layers.

The film of the present invention can be prepared simply by coextruding (i.e., simultaneously extruding) the various layers described above into a multilayer film. Coextrusion is a process well known to those of ordinary skill in the art. As the present invention is not directed to a new process of film manufacture, the reader is directed to any of a number of references detailing coextrusion.

Alternatively, the film of the present invention can be prepared by adhesively laminating the various layers. This process also is well known to those of ordinary skill in the art.

Regardless of the number of layers or the manner in which those layers are laminated, the overall film has an oxygen transmission rate of at least about 2000 $cm^3 \cdot mil/m^2 \cdot 24$ hr.·atm, preferably at least about 3000 $cm^3 \cdot mil/m^2 \cdot 24$ hr.·atm, more preferably at least about 4000 $cm^3 \cdot mil/m^2 \cdot 24$ hr.·atm, most preferably at least about 5000 $cm^3 \cdot mil/m^2 \cdot 24$ hr.·atm. Films with OTRs of at least about 6000 and even at least about 7000 $cm^3 \cdot mil/m^2 \cdot 24$ hr.·atm are described in the following examples. (All of the foregoing are measured at 73° F.)

The film of the present invention can be used in the packaging of oxygen sensitive food products such as, for example, fresh chicken, frozen red meat, and fresh cut produce (e.g., lettuce). Such food products can be packaged where a non-thermoforming film is used in combination with a thermoforming film to produce a final package. In a typical operation, a forming film is formed into a mold to provide a cavity in which a food product is placed. A non-forming film is placed over the cavity and vacuum sealed to the periphery of the forming film. (This type of process is well known to those of ordinary skill in the art.) Preferably, both the forming and non-forming films are the film of the present invention, described above.

Although the film of the present invention can be perforated if desired, it achieves the above-described OTRs without the need for such perforations.

The following examples are intended to illustrate certain preferred embodiments of the invention, but the present invention is not to be limited to these illustrative embodiments.

EXAMPLES

Example 1

Sample films were prepared by coextrusion. The polymer melt from the extrusion dies was cooled and cast into solid sheets having a thickness of 7.45 mils. The layers of the film, and the amount of each layer (in weight percentages) were as follows:

| PP | EVA | PP | EVA | PP | EVA | LLDPE |
|---|---|---|---|---|---|---|
| 22% | 12% | 7% | 6% | 7% | 8% | 38% | wherein
PP = Quantum Petrothene ™ polypropylene homopolymer (PP 2004-MR)
EVA = Exxon LD 720.92 ethylene/vinyl acetate copolymer (19% by wt. vinyl acetate)
LLDPE = Dow Dowlex ™ 2044A LLDPE One of the sheets was tested for OTR on an OX-TRANS™ Ten-Fifty Oxygen Permeability Tester, and the results for three cuts were 1061.8, 1077.4, and 1037.0 $cm^3/m^2 \cdot 24$ hr.·atm. On a per mil basis, these results correspond to about 7910, 8027, 7726 $cm^3 \cdot mil/m^2 \cdot 24$ hr.·atm, respectively.

The cuts were tested both longitudinally and transversely for tensile strength, elongation, and modulus. Each cut exhibited mechanical properties well within acceptable ranges.

Example 2

Another sample film was prepared. The sealing layer of this film was made by blending 83% Dowlex™ 2044A LLDPE and 15% Attane™ 4201 ULDPE with about 2% of a master batch concentrate containing slip and antiblock additives. The antiblock master batch included Ampacet™ 10853 antiblock. This sealing layer blend was coextruded into a film structure containing alternating layers of ethylene/vinyl acetate copolymers (similar to those from Example 1) and Exxon Escorene™ PD9302 ethylene/ propylene copolymer. The heat resistant layer was a blend of 98% Exxon Escorene™ PD 3345-88 polypropylene and 2% of a master batch including Ampacet™ 40604 antiblock.

The following polymeric layers were cast into films having thicknesses of 3.0, 3.5, 5.0, and 11 mils:

| Res. | EVA | EPC | EVA | EPC | EVA | Seal |
|------|-----|-----|-----|-----|-----|------|
| 12%  | 10% | 13% | 7%  | 13% | 7%  | 33%  | wherein
Res. = heat resistant layer
Seal = sealing layer

The 3.0 and 3.5 mil films were tested for OTR as in Example 1. The resultant transmission rates are shown below.

| | OTR (cc/m$^2$ · 24 hr. · atm) | | |
|---|---|---|---|
| | 1st cut | 2nd cut | 3rd cut |
| 3.0 mil | 1776 | 1876 | 1965 |
| 3.5 mil | 1779 | 1799 | 1889 |

The OTRs from this example meet the OTR requirements of film useful in the present invention. Specifically, on a per mil basis, these cuts had OTRs that ranged from a low of 5330 to a high of 6610 cm$^3$·mil/m$^2$·24 hr.·atm.

Cuts of the 3.0, 3.5, and 5.0 mil films were tested both longitudinally and transversely for tensile strength, elongation, and modulus. Each cut exhibited mechanical properties well within acceptable ranges.

Although illustrative embodiments have been described in detail hereinabove, the present invention is not to be limited to those embodiments. Various changes and modifications can be readily effected by persons of ordinary skill without departing from the spirit or scope of the invention.

For example, although it is generally preferred that film structures in accordance with the present invention are coextruded, films which are laminated such as by adhesive lamination, heat and pressure or corona lamination also are within the scope of the present invention.

We claim:

1. A multilayer film comprising:
   a) an outer heat sealable layer comprising a polymer comprising mer units derived from ethylene;
   b) an outer heat resistant layer comprising at least one polymer, said heat resistant layer having a melting point that is at least about 10° F. greater than that of the heat sealable layer; and
   c) a tie layer disposed between said heat sealable and heat resistant layers, said film being unperforated and having an oxygen transmission rate of at least about 3000 cm$^3$·mil/m$^2$·24 hr.·atm at 73° F.

2. The film of claim 1 wherein said heat resistant layer comprises a polymer comprising mer units derived from propylene.

3. The film of claim 2 wherein said polymer comprising mer units derived from propylene further comprises mer units derived from ethylene.

4. The film of claim 1 wherein said heat resistant layer comprises a polymer comprising mer units derived from styrene.

5. The film of claim 4 wherein said polymer comprising mer units derived from styrene further comprises mer units derived from butadiene.

6. The film of claim 1 wherein said polymer comprising mer units derived from ethylene in said heat sealable layer further comprises mer units derived from a $C_3$–$C_{10}$ α-olefin, vinyl acetate, an alkyl acrylate, acrylic acid, or methacrylic acid.

7. The film of claim 1 wherein said polymer comprising mer units derived from ethylene is a linear polyethylene.

8. The film of claim 1 wherein said polymer comprising mer units derived from ethylene is an ionomer.

9. The film of claim 1 wherein said heat sealable layer comprises a blend of two or more polymers comprising mer units derived from ethylene.

10. The film of claim 1 wherein said tie layer comprises a polymer comprising mer units derived from ethylene and vinyl acetate.

11. The film of claim 1 further comprising a fourth layer comprising a polymer comprising mer units derived from ethylene and propylene, said fourth layer being adjacent to said tie layer.

12. The film of claim 11 wherein said fourth layer is disposed between said tie layer and said heat resistant layer.

13. The film of claim 12 further comprising a second tie layer disposed between said fourth layer and said heat resistant layer.

14. The film of claim 13 wherein said second tie layer comprises a polymer comprising mer units derived from ethylene and vinyl acetate.

15. The film of claim 13 further comprising at least one of
   a) one or more additional ethylene/propylene copolymer layers and
   b) one or more additional tie layers, said additional layers being disposed between said first tie layer and said heat sealable layer.

16. The film of claim 1 wherein said film has an oxygen transmission rate of at least about 4000 cm$^3$·mil/m$^2$·24 hr.·atm at 73° F.

17. The film of claim 16 wherein said film has an oxygen transmission rate of at least about 5000 cm$^3$·mil/m$^2$·24 hr.·atm at 73° F.

18. The film of claim 17 wherein said film has an oxygen transmission rate of at least about 6000 cm$^3$·mil/m$^2$·24 hr.·atm at 73° F.

19. The film of claim 18 wherein said film has an oxygen transmission rate of at least about 7000 cm$^3$·mil/m$^2$·24 hr.·atm at 73° F.

20. The multilayer film of claim 1 wherein said heat sealable layer comprises linear low density polyethylene.

* * * * *